(12) United States Patent
Raut

(10) Patent No.: US 10,255,147 B2
(45) Date of Patent: Apr. 9, 2019

(54) FAULT TOLERANCE FOR CONTAINERS IN A VIRTUALIZED COMPUTING ENVIRONMENT

(71) Applicant: VMWARE, INC., Palo Alto, CA (US)

(72) Inventor: Gautam Umesh Raut, Pune (IN)

(73) Assignee: VMWARE, INC., Palo Alto, CA (US)

( * ) Notice: Subject to any disclaimer, the term of this patent is extended or adjusted under 35 U.S.C. 154(b) by 105 days.

(21) Appl. No.: 15/256,518

(22) Filed: Sep. 3, 2016

(65) Prior Publication Data

US 2017/0300394 A1 Oct. 19, 2017

(30) Foreign Application Priority Data

Apr. 14, 2016 (IN) .............................. 201641013164

(51) Int. Cl.
*G06F 11/00* (2006.01)
*G06F 11/20* (2006.01)
*G06F 9/455* (2018.01)

(52) U.S. Cl.
CPC ........ *G06F 11/203* (2013.01); *G06F 9/45558* (2013.01); *G06F 2009/45562* (2013.01); *G06F 2009/45575* (2013.01); *G06F 2009/45591* (2013.01); *G06F 2201/805* (2013.01); *G06F 2201/84* (2013.01)

(58) Field of Classification Search
CPC .... G06F 11/203; G06F 9/4856; G06F 9/5088; G06F 9/45558; G06F 2009/45562
See application file for complete search history.

(56) References Cited

U.S. PATENT DOCUMENTS

| 7,484,208 B1* | 1/2009 | Nelson ................ G06F 9/45558 711/6 |
| 8,756,598 B1* | 6/2014 | Costea ................ G06F 9/45558 717/174 |
| 9,699,150 B2* | 7/2017 | Lie ....................... H04L 63/0435 |
| 2012/0102135 A1* | 4/2012 | Srinivasan .......... G06F 9/45558 709/213 |
| 2013/0185408 A1* | 7/2013 | Ngo ...................... H04L 41/046 709/223 |
| 2015/0074054 A1* | 3/2015 | Antony ............. G06F 17/30088 707/639 |
| 2015/0295800 A1* | 10/2015 | Bala .................... H04L 67/2819 709/224 |
| 2015/0378831 A1* | 12/2015 | Tarasuk-Levin .... G06F 11/1484 714/15 |
| 2016/0283261 A1* | 9/2016 | Nakatsu .............. G06F 9/45558 |
| 2016/0350205 A1* | 12/2016 | Safari ................. G06F 11/1433 |

(Continued)

*Primary Examiner* — Michael Maskulinski
(74) *Attorney, Agent, or Firm* — Su IP Consulting

(57) ABSTRACT

Example methods are described to provide fault tolerance for a container in a virtualized computing environment that includes a first virtual machine and a second virtual machine. The method may comprise detecting a failure at the first virtual machine. The container may be supported by the first virtual machine to run an application on a first operating system of the first virtual machine. The method may further comprise providing data relating to the container to the second virtual machine; and based on the data relating to the container, resuming the container in the second virtual machine to run the application on a second operating system of the second virtual machine.

24 Claims, 9 Drawing Sheets

(56) References Cited

U.S. PATENT DOCUMENTS

2016/0378530 A1* 12/2016 Ramasubramanian ...................... G06F 9/45558 718/1
2017/0249178 A1* 8/2017 Tsirkin ................ G06F 9/45558
2017/0286153 A1* 10/2017 Bak ......................... G06F 9/485

* cited by examiner

FAULT TOLERANCE FOR CONTAINERS IN A VIRTUALIZED COMPUTING ENVIRONMENT

RELATED APPLICATION

Benefit is claimed under 35 U.S.C. 119(a)-(d) to Foreign Application Serial No. 201641013164 filed in India entitled "FAULT TOLERANCE FOR CONTAINERS IN A VIRTUALIZED COMPUTING ENVIRONMENT", filed on Apr. 14, 2016, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system (OS) and applications, such as central processing unit (CPU) resources, memory resources, storage resources, network resources, etc. Virtualization software (e.g., hypervisor) running on the physical machine is used to maintain a mapping between the virtual resources allocated to each virtual machine and the underlying physical resources of the host.

In a virtualized computing environment, container technologies may be used to run containers in a particular virtual machine. Unlike virtual machines, containers are "OS-less," which means that they do not include any OS that could consume, for example, tens of Gigabytes (GB). This makes containers more lightweight, portable, efficient and suitable for delivery into an isolated OS environment. Running containers inside a virtual machine (known as "containers-on-virtual-machine") not only leverages the benefits of container technologies, but also that of virtualization technologies. However, when the virtual machine crashes, the containers will also crash. This adversely affects the performance of the containers.

DETAILED DESCRIPTION

Figure 1:
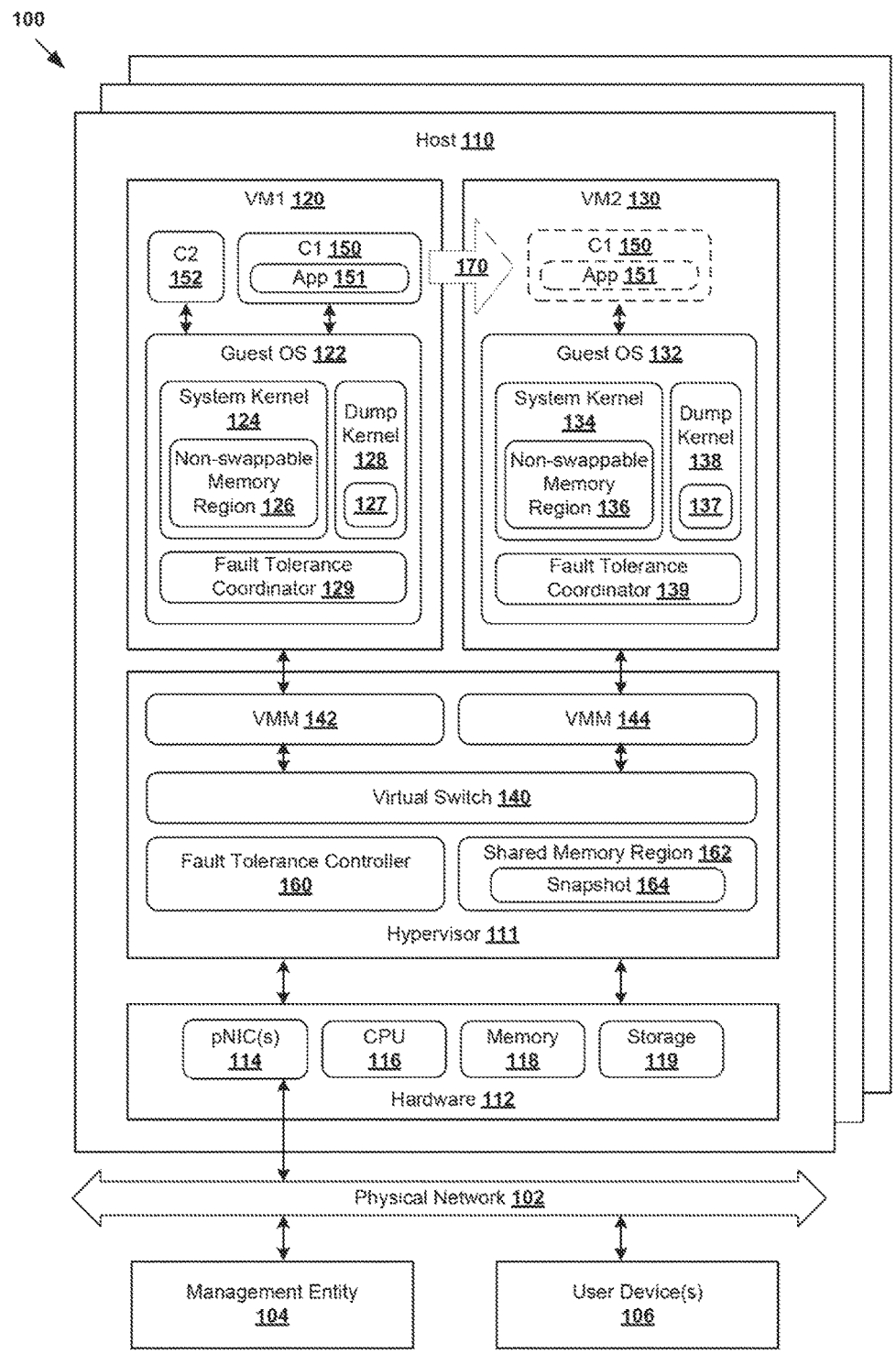
FIG. 1 is a schematic diagram illustrating an example virtualized computing environment to provide fault tolerance to a container.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of running a container inside a virtual machine in a virtualized computing environment will now be described in more detail. As used herein, the term "container" (also known as "container instance," "software container," "application container," etc.) may refer generally to an isolated user-space instance that may be used to encapsulate an application with all its dependencies, such as binaries, libraries, etc. Through OS-level virtualization, multiple containers may be run as isolated systems or processes on the same operating system (OS), sharing the same kernel on a guest OS of a virtual machine.

Conventionally, high availability approaches have been used in a cluster-based environment to provide fault tolerance for virtual machines. Continuous availability is provided to a primary virtual machine by creating and maintaining a secondary virtual machine to replace the primary virtual machine in the event of a failover. To implement such high availability approaches, it is necessary to configure a cluster of physical hosts such that the primary and secondary virtual machines reside on different hosts.

The primary and secondary virtual machines are required to exchange heartbeats to monitor the status of one another. Also, it is necessary to run the secondary virtual machine in a virtual lockstep with the primary virtual machine. This requires periodically sending all inputs and events that occur on the primary virtual machine to the secondary virtual machine (i.e., while both are up and running) to keep them synchronized. Maintaining the secondary virtual machine to be up and running all the time, and in the virtual lockstep with the primary virtual machine, consumes a lot of computing and network resources.

The high availability approaches are not designed to provide fault tolerance for a particular container running inside a virtual machine, and may not be suitable for all types of applications. For example, using container technologies, a business-critical, legacy application may be run inside a container. Here, the term "legacy application" may refer generally to a pre-existing application that is usually not aware of and not designed for cloud computing, high availability approaches, fault tolerance approaches, cluster or grid computing, etc. In this case, due to various limitations of the legacy application (e.g., implemented using older technologies or programming languages, etc.), it may be difficult to configure the legacy application to be cluster-aware to support the high availability approaches. In this case, when there is a failure (e.g., kernel panic) at the virtual machine, the container running the application will also fail even though the failure is not caused by the container. This leads to undesirable data loss or corruption at the container, which adversely affects its performance.

According to examples of the present disclosure, fault tolerance may be provided to a particular container running inside a virtual machine. When a failure is detected at a first virtual machine supporting a container to run an application, data relating to the container, such as a snapshot of the container, is provided to a second virtual machine. The container is then resumed in a second virtual machine based on the data relating to the container. In more detail, FIG. 1 is a schematic diagram illustrating example virtualized computing environment 100 to provide fault tolerance to a container. It should be understood that network environment 100 may include additional and/or alternative components than that shown, depending on the desired implementation.

In the example in FIG. 1, virtualized computing environment 100 includes multiple hosts 110 (also known as "computing devices", "host computers", "host devices", "physical servers", "server systems", etc.). Each host 110 includes virtualization software (e.g., hypervisor 111) and suitable hardware 112 to support various virtual machines, such as "VM1" 120 and "VM2" 130. In practice, there may be any number of hosts 110, each supporting tens or hundreds of virtual machines (two shown for simplicity in FIG. 1).

Hypervisor 111 maintains a mapping between underlying hardware 112 of host 110 and virtual resources allocated to virtual machines 120, 130. For example, hardware 112 includes components such as physical network interface controller(s) (NIC(s)) 114 to provide access to physical network 102; Central Processing Unit (CPU) 116, memory 118 (e.g., random access memory (RAM)) and storage disk 119 (e.g., solid state drive, hard disk drive), etc. In practice, hypervisor 111 may also be a "type 2" or hosted hypervisor that runs on top of a conventional operating system on host 110. Hypervisor 111 also implements virtual switch 140 to handle egress (i.e., outgoing) traffic forwarding from, and ingress (i.e., incoming) traffic to, virtual machines 120, 130. The term "traffic" may refer generally to a group of bits that can be transported together, such as in the form of "packets", "frames", "messages", "datagrams", etc.

Although examples of the present disclosure refer to "virtual machines," it should be understood that virtual machines running within a virtualized computing environment are merely one example of "virtualized computing instance" that represents an addressable data compute node (DCN), an isolated user space instance, etc. In practice, any suitable technologies aside from hardware virtualization may be used to provide isolated user space instances. The virtual machines may also be complete computation environments, containing virtual equivalents of the hardware and system software components of a physical system.

Management entity 104 provides management functionalities to manage various components in virtualized computing environment 100, such as hosts 110, virtual machines 120, 130. In practice, management entity 104 may be implemented by one or more virtual or physical entities. Users (e.g., network administrators) operating user devices 106 may access the functionalities of management entity 104 via any suitable interface (e.g., graphical user interface, command-line interface, etc.) and/or Application Programming Interface (API) calls via physical network 102. User device 106 may be any suitable computing device, such as user workstation, client device, mobile device, etc.

Virtual machines 120, 130 each represent a software implementation of a physical machine. Virtual resources are allocated to virtual machines 120, 130 to support respective guest OS 122, 132, and applications (e.g., containers that will be explained below), etc. For example, corresponding to hardware 112, the virtual resources may include virtual CPU, virtual memory, virtual disk, virtual network interface controller (vNIC), etc. Hardware resources may be emulated using virtual machine monitors (VMMs) 142, 144 implemented by hypervisor 111. In practice, VMMs 142, 144 may be considered as components that are part of virtual machines 120, 130, or alternatively, separated from them.

Using container technologies, containers "C1" 150 and "C2" 152 may be executed as isolated systems on guest OS 122 inside "VM1" 120. Any suitable container technology may be used, such as Linux container (LXC), Docker, etc. For example, LXC provides a lightweight virtualization mechanism to isolate processes and resources. In this example, container "C1" 150 hosted by "VM1" 120 runs application 151 (also known as "containerized application") that may be business-critical and relies on guest OS 122 to be up and running.

Figure 2:
FIG. 2 is a flowchart of an example process for a host to provide fault tolerance for a container.

To provide fault tolerance for containers (e.g., "C1" 150), host 110 is configured to resume "C1" 150 in "VM2" 130 when a failure occurs at "VM1" 120 (see also 170 in FIG. 1). The resumption or resurrection of "C1" 150 is performed based on snapshot 164 of "C1" 150. In more detail, FIG. 2 is a flowchart of example process 200 for host 110 to provide fault tolerance for container 150. Example process 200 may include one or more operations, functions, or actions illustrated by one or more blocks, such as 210 to 240. The various blocks may be combined into fewer blocks, divided into additional blocks, and/or eliminated depending on the desired implementation. As will be described further using FIG. 3 to FIG. 6, example process 200 may be implemented by host 110 using hypervisor 111, "VM1" 120 and "VM2" 130.

At 210 in FIG. 2, hypervisor 111, "VM1" 120 ("first virtual machine") and "VM2" 130 ("second virtual machine") on host 110 may be configured to provide fault tolerance for containers such as "C1" 150. Block 210 is shown in dotted line in FIG. 2 to indicate that the configuration may be performed independently from blocks 220 to 240. As will be described further using FIG. 3, the configuration may be made to host 110 via management entity 104 in virtualized computing environment 100 in FIG. 1, such as manually (e.g., based on inputs from a user via user device 106), programmatically, etc.

In the example in FIG. 1, block 210 may involve configuring hypervisor 111 to implement fault tolerance controller 160 (e.g., running as a daemon, etc.) and allocate shared memory region 162 to store data relating to containers (e.g., snapshots 164). Also, virtual machine 120/130 may be configured to implement fault tolerance coordinator 129/139; system kernel 124/134 having non-swappable memory region 126/136; dump coordinator 127/137 and dump kernel 128/138. Further, a particular container such as "C1" 150 may be selectively tagged for fault tolerance, while other containers (e.g., "C2" 152) are not tagged if fault tolerance is not required.

At 220 in FIG. 2, a failure is detected at "VM1" 120 supporting "C1" 150 to run application 151 on guest OS 122 ("first operating system") of "VM1" 120. As used herein, the term "failure" may refer generally to an error affecting a virtual machine, such as a kernel panic that occurs when a process running on system kernel 124 of guest OS 122 encounters an unrecoverable error. The kernel panic may occur due to hardware or software issues. In practice, kernel panics may be caused by software failure, hardware failure, a combination of both, etc.

At 230 in FIG. 2, in response to detecting the failure at "VM1" 120, data relating to "C1" 150 is provided to "VM2" 130. As used herein, the term "providing" may refer generally to make the data available to "VM2" 130 for the purpose of container resumption. For example, this may involve creating snapshot 164 of "C1" 150 and storing it in shared memory region 162 that is accessible by "VM2" 130. As used herein, the term "snapshot" of a container may refer generally to a representation (e.g., image) of the state of the container at a particular time. The snapshot may include any suitable data required to resume "C1" 150 in "VM2" 130, such as an image of "C1" 150. The snapshot may include data relating to application 151, including data relating to file system, registers, memory, processes, task structures, etc. It should be understood that it is not necessary to create a snapshot of the entire "VM1" 120. Also, since "C2" 152 is not tagged for fault tolerance, it is not necessary to snapshot "C2" 152.

At 240 in FIG. 2, "C1" 150 is resumed in "VM2" 130 based on snapshot 164 to run application 151 on guest OS 132 ("second operating system") of "VM2" 130. In one example, "VM2" 130 may be configured to be a clone of "VM1" 120. As used herein, the term "clone" may refer generally to a copy of an existing virtual machine, which is also called the parent of the clone. Once the cloning process is completed, the clone (e.g., "VM2" 130) generally exists as a separate virtual machine and changes to the clone will not affect the parent (e.g., "VM1" 120), and vice versa.

"VM2" 130 may be configured to have a low scheduling priority or operate in a suspended state when "C1" 150 is running in "VM1" 120. However, when "C1" 150 is resumed in "VM2" 130, "VM2" 130 may be assigned with a higher scheduling priority or resumed from a suspended state. Running "VM2" 130 with a low scheduling priority reduces resource consumption and the time required to resume "C1" 150 in "VM2" 130. As such, compared to conventional high availability approaches, it is not necessary to keep "VM2" 130 up and running all the time or maintain "VM1" 120 and "VM2" 130 in a virtual lockstep. This avoids the processing burden associated with synchronizing "VM1" 120 with "VM2" 130 and reduces unnecessary traffic between them.

Using example process 200, application 151 running inside "C1" 150 may face relatively little down time when there is a failure at "VM1" 120. For example, "C1" 150 may resume in "VM2" 130 without reinitializing or restarting itself. As will be described using FIG. 3 and FIG. 4, a "zero-copy" data transfer mechanism may be used to transfer snapshot 164 of "C1" 150 from "VM1" 120 to "VM2" 130 using shared memory region 162. This improves the efficiency for transferring snapshot 164 and reduces the amount of time required to do so.

In the following, various examples will be discussed with reference to FIG. 3 to FIG. 9. Example configurations of host 110 to provide fault tolerance for containers will be explained using FIG. 3, example implementations using FIG. 4 to FIG. 6, example approach to maintain a transport layer connection using FIG. 7, example implementation across different hosts using FIG. 8 and example computing device using FIG. 9.

Host Configuration

Figure 3:
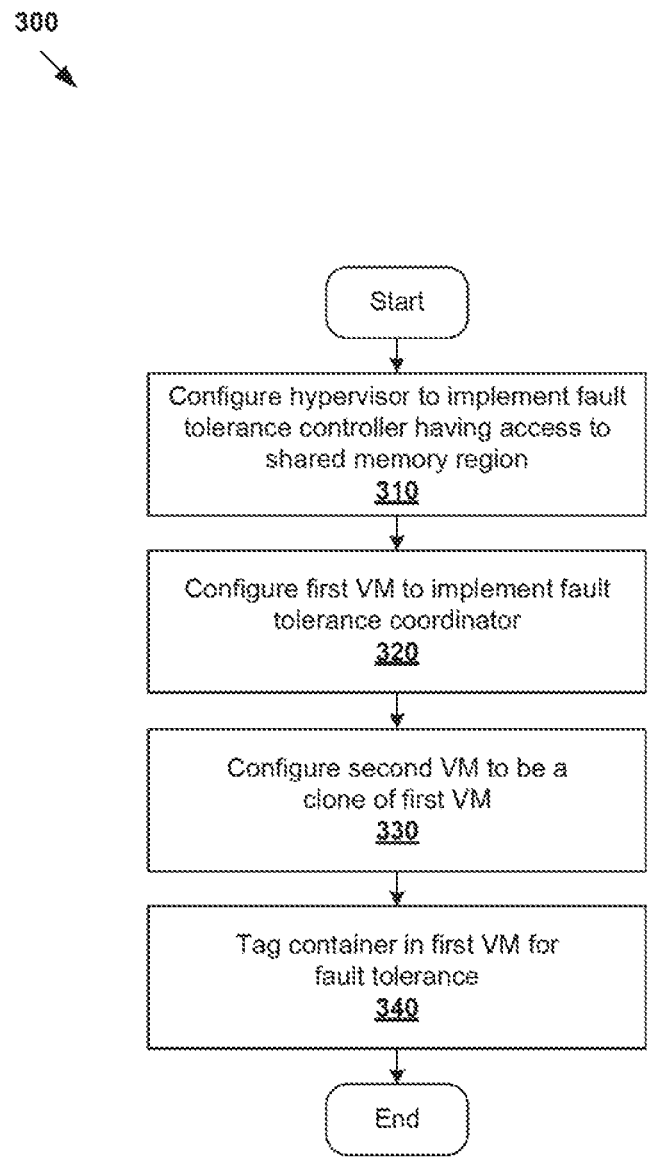
FIG. 3 is a flowchart of an example process to configure a hypervisor, first virtual machine and second virtual machine to provide fault tolerance for a container.

FIG. 3 is a flowchart of example process 300 to configure hypervisor 111, first virtual machine 120 and second virtual machine 130 to provide fault tolerance for containers. Example process 300 may include one or more operations, functions, or actions illustrated by one or more blocks, such as 310 to 340. The various blocks may be combined into fewer blocks, divided into additional blocks, and/or eliminated depending on the desired implementation.

The configurations in FIG. 3 may be performed by host 110 based on requests from management entity 104 and inputs by a user (e.g., network administrator) operating user device 106 via an interface provided by management entity 104. Alternatively, the configurations may be initiated programmatically (e.g., using a script), etc. The following examples will be explained with reference to a Linux kernel, but it should be understood that any other suitable kernel may be used. The examples below may be applied to provide fault tolerance for different containers on different virtual machines.

At 310 in FIG. 3, hypervisor 111 is installed with fault tolerance controller 160 and allocated with shared memory region 162 (e.g., RAM). Fault tolerance controller 160 is to authenticate requests from "VM1" 120 (e.g., dump kernel 128), perform container snapshotting (e.g., when requested by dump kernel 128), and store container snapshots 164 in shared memory region 162. For security reasons, both "VM1" 120 and "VM2" 130 are able to access shared memory region 162, but only if permitted by fault tolerance controller 160.

At 320 in FIG. 3, configuration of "VM1" 120 is performed, which involves (a) user space configuration to configure fault tolerance coordinator 129; (b) system kernel configurations to configure system kernel 124 having non-swappable memory region 126; and (c) configuration of dump coordinator 127 in an image of dump kernel 128. The various configurations will be described further below.

(a) User space configuration: Fault tolerance coordinator 129 may be implemented as a daemon that is able to communicate with fault tolerance controller 160 on hypervisor 111 using any suitable interface. For example, Virtual Machine Communication Interface (VMCI) that is designed to facilitate communication between a virtual machine and its host may be used.

(b) System kernel configurations: To support fault tolerance activity, configuration of system kernel 124 may involve (1) creating non-swappable memory region 126; (2) modifying do_fork( ) system call implementation; (3) modifying panic( ) system routine (i.e., panic handler); (4) modifying socket creation and teardown routines; and (5) modifying dump kernel 128. System kernel 124 is a kernel that is booted with specific "kdump" flags to facilitate kernel crash dumping. Using Linux as an example, various modifications may be made to a conventional Linux kernel to facilitate fault tolerance.

(b)(1) Non-swappable memory region 126 is created to store metadata of "C1" 150, including a list of pointers to task structures that are part of container 150. Each task structure (e.g., task_struct) represents a "process" and stores information about the process, such as its name, files, scheduling algorithm, memory usage, etc. The terms "task structure" and "process" are generally used interchangeably. When a task structure is created inside container 150, an associated entry is added in non-swappable memory region 126. Non-swappable memory region 126 will be accessible by the modified do_fork( ), panic( ), socket creation routine(s) (e.g., sock_create( )) and and socket teardown routine(s) (e.g., close( ), shutdown( ), soabort( )) below.

(b)(2) The do_fork( ) routine of the Linux kernel may be modified to check if a task structure being created is part of a namespace of a particular container. A configuration file may be used to store a list of containers (e.g., "C1" 150) that are tagged for fault tolerance. In the event of a failure, the configuration file is used to maintain a sequence of containers to be snapshotted and resumed. This ensures that interdependency between multiple containers is protected or preserved. The configuration list is copied in non-swappable memory region 126.

Figure 5:
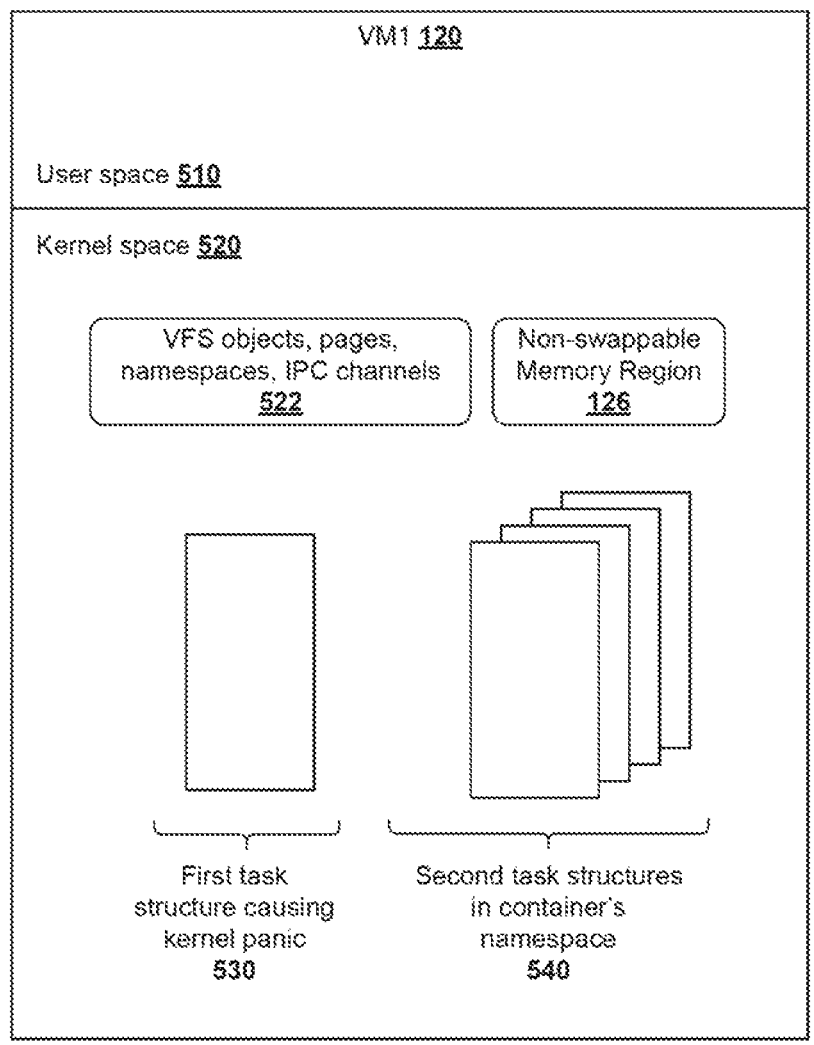
FIG. 5 is a schematic diagram illustrating example user space and kernel space of a virtual machine in FIG. 1.

(b)(3) Panic handler of system kernel 124 may be modified such that, in the event of a kernel panic, non-swappable memory region 126 is updated with a pointer to a crashed task structure (see also "first task structure" 530 in FIG. 5). The panic handler also stores any other suitable crash-related data in non-swappable memory region 126.

(b)(4) Transmission Control Protocol Internet Protocol (TCP/IP) related socket creation implementation is also modified to ensure that applications inside a container (e.g., application 151 of "C1" 150) do not lose their connectivity with their TCP peers. For example, socket is internally represented using struct inode, which is also used for file system objects. A list of opened sockets of a process or task may be obtained by traversing opened file objects from a task structure. Further, the type of every file object should be checked to determine whether it is of type socket (e.g., using macro "define S_ISSOCK(m) (((m & S_IFMT)==S_IF-SOCK)"). Since a task can have many such files opened, one way of speeding up the process of obtaining opened sockets of a task may involve adding a socket's entry (e.g., sock_create( ) routine) in non-swappable memory area 126. Implementation of teardown routine(s) such as close( ), shutdown( ) or soabort( ) should also be modified such that the entry of the socket is removed from non-swappable memory area 126 during socket closure.

(b)(5) System kernel 124 reserves some memory (e.g., RAM) for dump kernel 128 (also known as "dump-capture kernel"). In the event of a kernel panic, dump kernel 128 is configured store a memory image (i.e., memory dump) of system kernel 124. For example, a feature of the Linux kernel called kernel dump (kdump) may be used to preserve system consistency by booting dump kernel 128, and using dump kernel 128 to export and save the memory image of system kernel 124. Kdump is based on a kernel execution (kexec) mechanism, which provides the ability to boot over the running system kernel 124. As will be described using FIG. 4, dump kernel 128 may also be configured to perform sanity checks on container 150.

Dump kernel 128 may contact fault tolerance controller 160 on hypervisor 111 using a utility called dump coordinator 127 via any suitable interface, such as VMCI interface. In practice, dump kernel 128 may serve to provide a platform to access an image of a previously alive system kernel and non-swappable memory area 126 (e.g., "/proc/vmcore"). To be able to communicate with fault tolerance controller 160, dump coordinator 127 is configured to as a mediator between dump kernel and fault tolerance controller 160. Also, dump kernel 128 being a very tiny kernel context has limitations in terms of stack and data regions available to it. Dump coordinator 127 provides a larger stack and data region compared to dump kernel 128, and can afford to sleep as it handles input/output (I/O) with fault tolerance controller 160.

At 330 in FIG. 3, "VM2" 130 is configured to resume "C1" 150 in the event of a failure at "VM1" 120. For example, "VM2" 130 is configured as a clone of "VM1" 120, and has corresponding components fault tolerance coordinator 139, system kernel 134 having non-swappable memory region 136, and dump kernel 138. Once created, an image of the clone is stored on a data store on hypervisor 111. In one example, "VM2" 130 may be created with a low scheduling priority, and a higher scheduling priority is assigned when used to resume "C1" 150. In another example, "VM2" 130 may be configured to operate in a suspended state until it is required to resume "C1" 150. Both examples serve to minimize resource consumption of "VM2" 130 on host 111 and reduce the effect on other components of hypervisor 111.

At 340 in FIG. 3, container "C1" 150 with application 151 is tagged for fault tolerance before being deployed on "VM1" 120. For example, as explained at 320 in FIG. 3, a configuration file may be used to store a list of containers that are tagged for fault tolerance. In this case, an entry for "C1" 150 may be created in the configuration file such that "C1" 150 will be snapshotted and resumed in "VM2" 130 in the event of a failure. The configuration file will be used to determine a sequence of containers to be snapshotted and resumed.

Fault Tolerance

Figure 4:
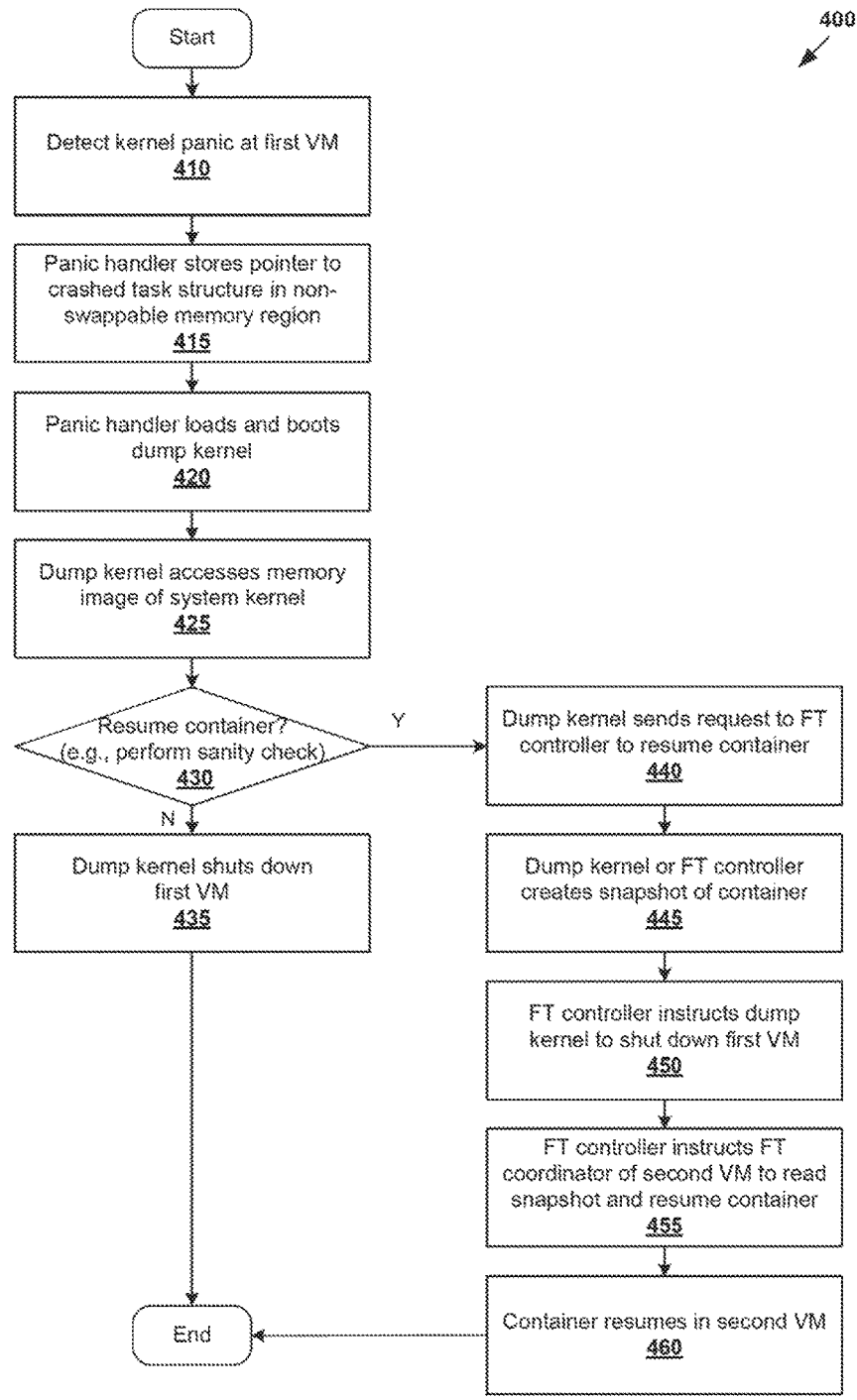
FIG. 4 is a flowchart of an example process for a host to provide fault tolerance for container.

FIG. 4 is a flowchart of example process 400 for host 110 to provide fault tolerance for container 150. Example process 400 may include one or more operations, functions, or actions illustrated by one or more blocks, such as 410 to 460. The various blocks may be combined into fewer blocks, divided into additional blocks, and/or eliminated depending on the desired implementation.

At 410 and 415 in FIG. 4, upon detecting a failure such as a kernel panic at "VM1" 120, a panic handler of system kernel 124 stores a pointer to a task structure in whose context the kernel panic has occurred in non-swappable memory region 126. At 420 in FIG. 4, the panic handler also loads and boots dump kernel 128, such as using the kexec utility described with reference to block 320 in FIG. 3.

At 425 in FIG. 4, dump kernel 128 accesses a memory image of system kernel 124 from non-swappable memory region 126, for example at a particular address provided by the panic handler at system kernel 124. Non-swappable memory region 126 also stores a configuration file discussed with reference to block 320 in FIG. 3.

At 430 in FIG. 4, since "C1" 150 is tagged for fault tolerance (i.e., as listed in the configuration file), dump kernel 128 determines whether to resume "C1" 150 on "VM2" 130. As will be described further using FIG. 5 and FIG. 6, the determination may include performing a "sanity check" or "sanity validation" to determine whether a task structure in whose the kernel panic has occurred can be isolated from task structures of "C1" 150.

At 435 in FIG. 3, if the determination is not in the affirmative (i.e., do not resume "C1" 150), dump kernel 128 proceeds to shut down guest OS 122 of "VM1" 120 and power off "VM1" 120.

At 440 in FIG. 4, if the determination at 430 is in the affirmative (i.e., resume "C1" 150), dump kernel 128 sends a request to fault tolerance controller 160 of hypervisor 111 to resume "C1" 150 on another virtual machine. The request may include one or more guest addresses to access non-swappable memory region 126, such as address of the memory image of system kernel 124 and address of container metadata. As described at 320 in FIG. 3, dump kernel 128 may use a utility called dump coordinator to send the request via a VMCI interface. For security purposes, fault tolerance controller 160 authenticates the request from dump kernel 128.

At 445 in FIG. 4, a snapshot of "C1" 150 is created by (a) dump kernel 128 or (b) fault tolerance controller 160. For example, dump kernel 128 may determine whether it has sufficient resources (e.g., CPU, memory) to create the snapshot. Both examples are discussed below.

(a) If dump kernel 128 decides to perform the snapshotting itself, snapshot 164 of "C1" 150 is created and stored in shared memory region 162. In this case, for dump kernel 128 to access shared memory region 162 to store snapshot 164, fault tolerance controller 160 will have to map an address space used by shared memory region 162 to an address space used by dump kernel 128. Fault tolerance controller 160 is informed by dump kernel 128 once the snapshotting process is completed.

(b) Otherwise, if dump kernel 128 decides to delegate the snapshot creation process to fault tolerance controller 160, dump kernel 128 sends a request to fault tolerance controller 160. In this case, fault tolerance controller 160 translates the guest addresses received from dump kernel 128 (e.g., via the dump coordinator utility) to corresponding machine pages (MPNs) to access any relevant data. For example, based on the memory image (e.g., core image) of system kernel 124, fault tolerance controller 160 creates snapshot 164 of "C1" 150 and stores snapshot 164 in shared memory region 162.

In practice, snapshot 164 of "C1" 150 may be an image that can be stored (e.g., in a private repository, memory region) such that it can be used on another virtual machine. For example, "C1" 150 may be made of multiple file system layers. While taking snapshot 164, a specific set of layer(s) may be included or excluded. When performing the "sanity check" at 430 in FIG. 4, the kernel stack of "C1" 150 may be read to check whether the current crash has occurred in any of the file system layers. If yes, that particular layer may be omitted from snapshot 164. In one example, every task structure has a pointer to file system objects used by it (called VFS objects). For all task structures in a container, it is determined the VFS objects pointed by the task structures are the same as of VFS objects of a crashed kernel context. If yes, the sanity check at 430 fails.

At 450 in FIG. 4, once snapshot 164 of "C1" 150 is created, fault tolerance controller 160 instructs dump kernel 128 to shut down "VM1" 120.

As described using FIG. 2 and FIG. 3, clone "VM2" 130 may be powered ON after "VM1" 120 is shut down. For example, a cloning utility provided by VMware, Inc. called "VM Fork" may be used to power ON "VM2" 130 (i.e., child VM) from snapshot 164 after "VM1" 120 (i.e., parent VM) is shut down. This allows "VM2" 130 to resume "C1" 150 relatively quickly to reduce service interruption and down time. When "C1" 150 is resumed, "VM2" 130 is assigned with a higher scheduling priority or resumed from a suspended state. Once fully resumed, "VM2" 130 will have its fault tolerance coordinator 139 up and running. When "VM1" 120 is booted in its dump kernel 128, "VM1" 120 will be in a maintenance state and cannot function as normal.

At 455 in FIG. 4, fault tolerance controller 160 instructs "VM2" 130 to resume "C1" 150, such as by sending a request to fault tolerance coordinator 139 over a VMCI interface. A zero-copy data transfer mechanism is used. In particular, the request is to instruct fault tolerance coordinator 139 to access snapshot 164 of "C1" 150 from shared memory region 162, and resume "C1" 150 based on snapshot 164. Fault tolerance controller 160 is also responsible of mapping the address space of shared memory region 162 to the address space of "VM2" 130. As such, since snapshot 164 of "C1" 150 is accessible from shared memory region 162, it is not necessary for "VM2" 130 to allocate any separate space for copying snapshot 164 into its own address space.

At 460 in FIG. 4, once "C1" 150 resumes in "VM2" 130, "C1" 150 and application 151 may run on guest OS 132 of "VM2" 130 and carry on its processes as it was before the failure at "VM1" 120.

Various changes may be made to the examples discussed above to improve performance. For example, instead of using dump kernel 128 to copy snapshot 164 into shared memory region 162 that is accessible by "VM2" 130, the copying process may be eliminated by allocating all the involved pages of "C1" 150 from shared memory region 162 while "VM1" 120 was fully up and running. Hypervisor 111 may facilitate "VM1" 120 to allocate pages for its business-critical "C1" 150 to allocate pages from a memory area that is shared between virtual machines 120, 130. In this case, there may be a large savings on the memory required for data contents of a container being snapshotted. For example, a page share (PShare) feature that allows machine pages to be shared across multiple virtual machines based on their contents may be used. This feature can be extended further to allocate memory from shared memory region 162. Also, instead of having to create snapshot 164, "VM2" 130 may be resumed based on metadata kept in non-swappable memory region 126 of "VM1" 120. In this case, an area of shared memory region 162 is configured to store the metadata that will be used by fault tolerance coordinator 139 of "VM2" 130 while resuming execution of container "C1" 150 inside "VM2" 130.

Isolating Container's Task Structures

Figure 6:
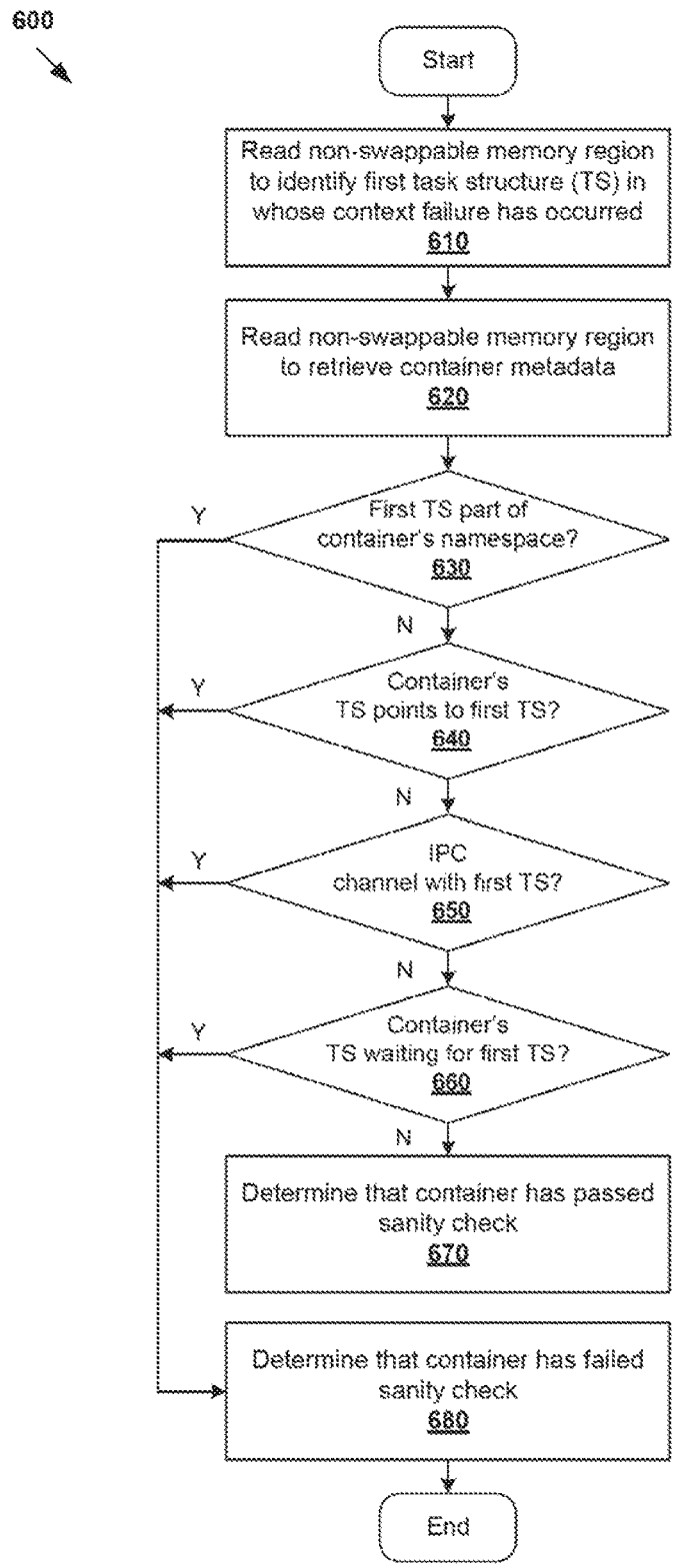
FIG. 6 is a flowchart of an example process for a host to inspect task structures of a container.

With reference to FIG. 5 and FIG. 6, an example of how dump kernel 128 of "VM1" 120 may determine whether to resume "C1" 150 in "VM2" 130 at 430 in FIG. 4 will now be explained. In more detail, FIG. 5 is a schematic diagram illustrating example user space 510 and kernel space 520 of virtual machine 120 in FIG. 1. Kernel space 520 stores various data objects relating to processes executed on guest OS 122, such virtual file system (VFS) objects, machine pages, namespaces, inter-process communication (IPC) channels established between processes (see 522). As explained using FIG. 1 and FIG. 3, non-swappable memory region 126 is allocated to store container metadata, pointers to task structures, etc.

In the example in FIG. 5, non-swappable memory region 126 includes pointers to a particular task structure (see "first task structure" 530) in whose context a kernel panic has occurred at system kernel 124, as well as task structures (see "second task structures" 540) that are part of a namespace of "C1" 150. To determine whether "C1" 150 should be resumed in "VM2" 130, a sanity check may be performed to ascertain whether second task structures 540 associated with "C1" 150 may be isolated from first task structure 530. If passed, this means that the context of "C1" 150 can be isolated from that of the crashed context, and it is safe to resume "C1" 150 in "VM2" 130.

Conventionally, the above sanity check is performed manually by an administrator, which is inefficient and time consuming. According to examples of the present disclosure, an automated process may be used to improve resolution time. FIG. 6 is a flowchart of example process 600 for host 110 to inspect task structures 540 of container 150. Example process 600 may include one or more operations, functions, or actions illustrated by one or more blocks, such as 610 to 680. The various blocks may be combined into fewer blocks, divided into additional blocks, and/or eliminated depending on the desired implementation.

When used together with example process 400, the example in FIG. 6 may be performed by dump kernel 128 of "VM1" 120 at block 430 in FIG. 4. However, as will be explained below, the example in FIG. 6 may be used for other applications not related to container fault tolerance. In this case, any suitable component(s) may be used to perform example process 600.

At 610 in FIG. 6, non-swappable memory region 126 is read to identify first task structure 530 in whose context the failure (e.g., kernel panic) has occurred at "VM1" 120. For example in FIG. 4, dump kernel 128 may inspect a memory image of system kernel 124 (located at a particular address of non-swappable memory region 126) to identify first task structure 530.

At 620 in FIG. 6, non-swappable memory region 126 is read to retrieve metadata of "C1" 150. For example in FIG. 4, dump kernel 128 may inspect the metadata to obtain a list of pointers to second task structures 540 associated with "C1" 150.

At 630 to 660 in FIG. 6, a series of checks is performed. In particular, at 630 in FIG. 6, it is determined whether first task structure 530 is part of the same namespace as that of "C1" 150. At 640 in FIG. 6, second task structures 540 are inspected to determine whether they point to first task structure 530, including whether any of the corresponding processes has opened a struct file or device object pointing to first task structure 530. For a Linux kernel, a virtual memory area (VMA) of each process may be inspected to check whether its corresponding vm_file is pointing to first task structure 530.

Further, at 650 in FIG. 6, it is determined whether there is any IPC channel established between first task structure 530 and any second task structure 540 (or corresponding process in the namespace of "C1" 150). At 660 in FIG. 6, it is determined whether any container's process associated with second task structure 540 is waiting for a result from or event caused first task structure 530.

At 670 in FIG. 6, it is determined that "C" 150 has passed the sanity check if it passes all checks at 630 to 660 in FIG. 6. In the example in FIG. 4, this means that second task structures 540 of "C1" 150 may be isolated from first task structure 530, and it is safe to resume "C1" 150 in "VM2" 130.

Otherwise, at 680 in FIG. 6, it is determined "C1" 150 has failed the sanity check if it fails any one of the checks at 630 to 660 in FIG. 6. In the example in FIG. 4, this means that second task structures 540 of "C1" 150 cannot be isolated from first task structure 530. In this case, if resumed in "VM2" 130, "C1" 150 might cause system kernel 134 of "VM2" 130 to crash.

Using example process 600, a faulty or crashed context may be isolated automatically, and substantially immediately, after a crash. This reduces delay associated with manual inspection of kernel dump, improves resolution time, and allows "C1" 150 to be resumed relatively quickly after the crash. Although described with reference to a container fault tolerance application, it should be understood that verification and isolation of a container's context from that of a crashed context may be useful in other applications, i.e., regardless of whether the container is snapshotted or not. A few examples are discussed below.

Using example process 600 in FIG. 6, the task of upgrading or downgrading a crashed context to a safe version may be automated by maintaining a change-list of components. In another example, example process 600 may be used to facilitate a root-cause analysis of a crash. In a Linux kernel for example, the vmcore dumps often do not include all kernel memory and it is difficult to perform the root-cause analysis due to the lack of required memory regions. While doing a sanity check, memory regions associated with the crash may be identified.

Further, whenever any application of a container submits a request to write data to a file system, the file system copies the data into its own buffer and informs the application that the request is successful. However, for internal input/output (I/O) optimization, the file system does not synchronize or write the data to the disk immediately. If a kernel panic occurs in a different path than that of the file system's context, the file system will have to discard the data yet to be written, even though the data appears to have been written from the perspective of the application. Using example process 600 in FIG. 6, the file system's context may be isolated from that of the crashed task. As such, instead of discarding the data, the file system may fulfil the application's write request and flush of the data to the disk from a dump kernel's context. The same principles may be applied for clearing any network queues associated with a container in a kernel panic situation.

Maintaining Transport Layer Connection

Transmission Control Protocol (TCP) is a transport layer protocol that offers reliable data transfer between two endpoints. TCP is connection-oriented, and requires endpoints to establish a TCP connection with each other before data transfer occurs. In practice, for example, the TCP connection may be established using a three-way handshake using a synchronization (SYN) packet, synchronization-acknowledgement (SYN-ACK) packet and acknowledgement packet (ACK). For example in FIG. 1, "C1" 150 may serve as an endpoint of a TCP connection with a network peer (not shown for simplicity), which may be another host, virtual machine, container, etc.

Figure 7:
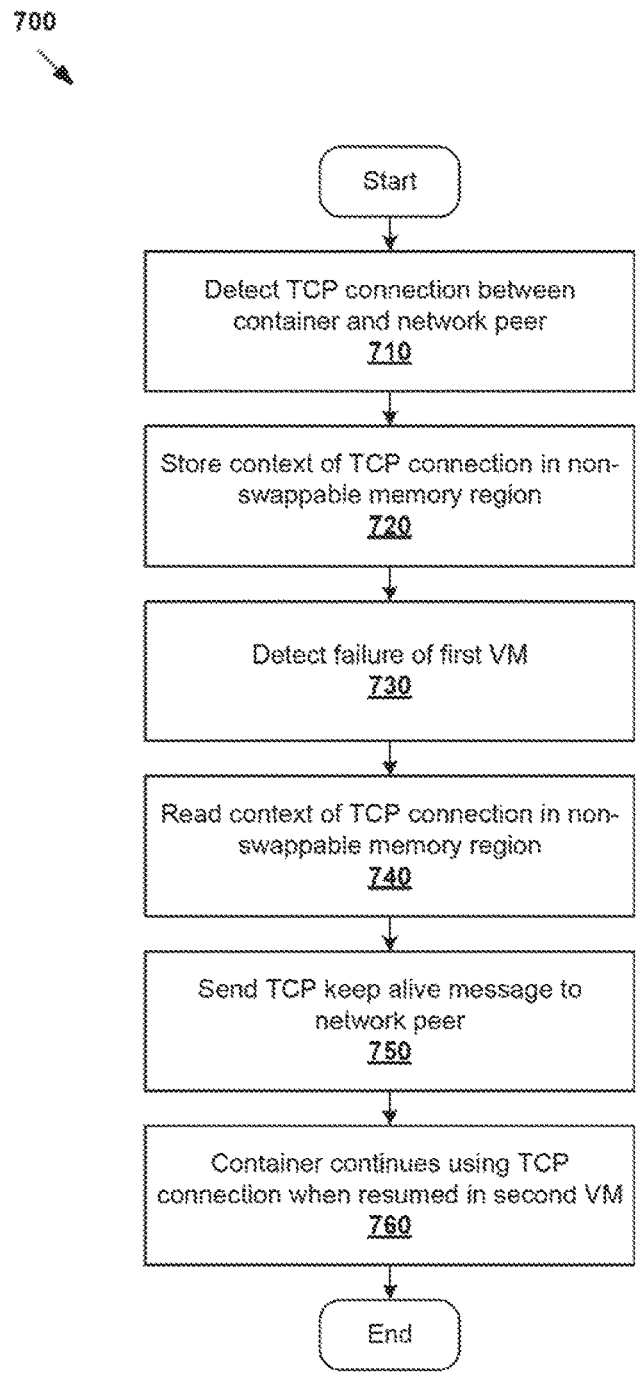
FIG. 7 is a flowchart of an example process for a host to maintain a transport layer connection involving a container.

Conventionally, the TCP connection is usually lost when there is a kernel panic at "VM1" 120 hosting "C1" 150. According to examples of the present disclosure, a TCP connection may be maintained such that the same TCP connection may be used once "C1" 150 is resumed on "VM2" 130. In more detail, FIG. 7 is a flowchart of example process 700 for host 110 to maintain a transport layer connection involving container 150. Example process 700 may include one or more operations, functions, or actions illustrated by one or more blocks, such as 710 to 760. The various blocks may be combined into fewer blocks, divided into additional blocks, and/or eliminated depending on the desired implementation. Although the example in FIG. 7 is described with reference to TCP, it should be understood that any other connection-oriented transport layer protocol may be used.

At 710 and 720 in FIG. 7, upon identifying a TCP connection involving "C1" 150 that is tagged for fault tolerance, system kernel 124 stores context (e.g., data relating to network socket) of the TCP connection in non-swappable memory region 126. The TCP connection may be established between "C1" 150 and a network peer, and initiated by either endpoint.

At 730 in FIG. 7, a failure (e.g., kernel panic) of "VM1" 120 may be detected and handled according to blocks 410 to 430 in FIG. 4. For example, dump kernel 128 performs the necessary sanity check and requests fault tolerance controller 160 to resume "C1" 150. Fault tolerance controller 160 may also performs any necessary authentication and snapshot creation process if requested.

At 740 in FIG. 7, fault tolerance controller 160 reads the context of the TCP connection from non-swappable memory region 126. Based on the context, fault tolerance controller 160 may identify the TCP connection and learn that is still active and valid. However, due to the time required to create a snapshot of "C1" 150 and resume it on "VM2" 130, the network peer may declare the TCP connection as "timed out." For example, the process of resuming "C1" 150 in "VM2" 130 may face various delays caused by the panic handler of system kernel 124; dump kernel 128 during boot-up and sanity checks; dump kernel 128 or fault tolerance controller 160 during snapshot creation; cloning of "VM1" 120; and "VM2" 130 resuming "C1" 150 based on its snapshot 164.

At 750 in FIG. 7, fault tolerance controller 160 maintains the TCP connection by sending one or more TCP keep-alive messages to the network peer. For example, the TCP keep-alive message may be a packet with no data and its ACK flag turned on.

At 760 in FIG. 7, once resumed in "VM2" 130, "C1" 150 may continue using the same TCP connection with the network peer to send and/or receive packets. This way, the TCP connection is maintained until "C1" 150 is resumed.

Remote Direct Memory Access

Figure 8:
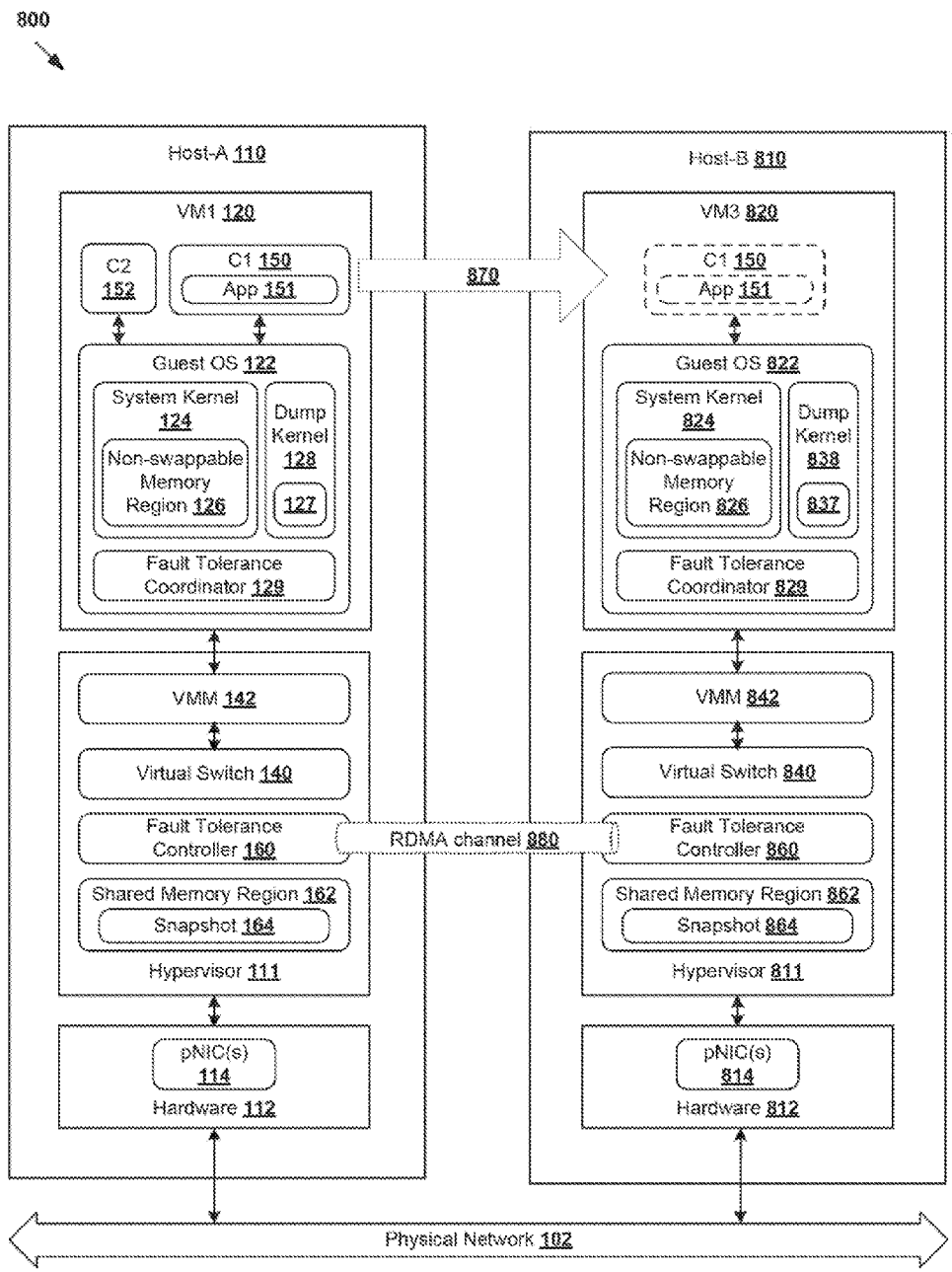
FIG. 8 is a schematic diagram illustrating an example virtualized computing environment to provide fault tolerance to a container using remote direct memory access (RDMA)

Although "VM1" 120 and "VM2" 130 in FIG. 8 both reside on the same host 110, it should be understood that examples of the present disclosure may be implemented across different hosts 110. In more detail, FIG. 8 is a schematic diagram illustrating example virtualized computing environment 800 to provide fault tolerance to container 150 using remote direct memory access (RDMA). It should be understood that network environment 100 may include additional and/or alternative components than that shown, depending on the desired implementation.

In the example in FIG. 8, virtualized computing environment 800 includes multiple hosts, such as Host-A 110 (i.e., host 110 explained in FIG. 1) supporting "VM1" 120 and Host-B 810 supporting "VM3" 820. Similar to hypervisor 111 of Host-A 110 explained using FIG. 1, hypervisor 811 of Host-B 810 implements fault tolerance controller 860 and shared memory region 862 to store snapshots of containers. Similar to hardware 112 of Host-A 110, hardware 812 of Host-B 810 includes various physical resources, including physical NIC(s) 814. Similar to "VM1" 120 of Host-A 110, "VM3" 820 of Host-B 810 implements system kernel 824 with allocated non-swappable memory region 826, dump kernel 828 and fault tolerance 829. "VM3" 820 may be configured as a clone of "VM1" 120.

In the event of a failure at "VM1" 120, it is desirable to resume "C1" 150 in "VM3" 820 (see arrow 870 in FIG. 8). To achieve container resurrection across different hosts, RDMA channel 880 is established between Host-A 110 and Host-B 810 such that one host is able to read or modify the memory of another host directly. In this case, shared memory region 162/862 may be conceptual and physically implemented using RDMA channel 880. Physical NICs 114, 814 of respective Host-A 110 and Host-B 810 are enabled with RDMA (e.g., RDMA-enabled interfaces) to support a data transfer via RDMA channel 880 over physical network 102. Since specific RDMA buffers (e.g., in user-space memory) are used for the data transfer, a zero-copy data transfer may be performed.

The examples discussed using FIG. 2 to FIG. 7 may also be implemented in virtualized computing environment 800. For example, according to example process 400 in FIG. 4, Host-A 110 (e.g., system kernel 124, dump kernel 128, fault tolerance controller 160, etc.) performs blocks 410 to 450 to create snapshot 164 of "C1" 150. Sanity checks described using FIG. 5 and FIG. 6, and transport layer connection maintenance described using FIG. 7 may also be implemented during the snapshot creation process.

Further, according to block 455 in FIG. 4, fault tolerance controller 160 at Host-A 110 also instructs fault tolerance controller 860 at Host-B 810 to resume "C1" 150. At this stage, fault tolerance controller 160 at Host-A 110 also sends snapshot 164 of "C" 150 to via RDMA channel 880 using any suitable application programming interface (API). RDMA supports zero-copy networking using specific RDMA buffer(s). Once the data transfer completes, fault tolerance coordinator 829 of "VM3" 820 reads snapshot 164 of "C1" 150 from the RDMA buffer(s) and resumes "C1" 150 in "VM3" 820.

Although an example using RDMA is shown in FIG. 8, it should be understood any other suitable approach may be used. For example, snapshot 164 of "C1" 150 may be delivered to Host-B 810 over a TCP/IP-based socket, etc.

Commuting Devices

Figure 9:
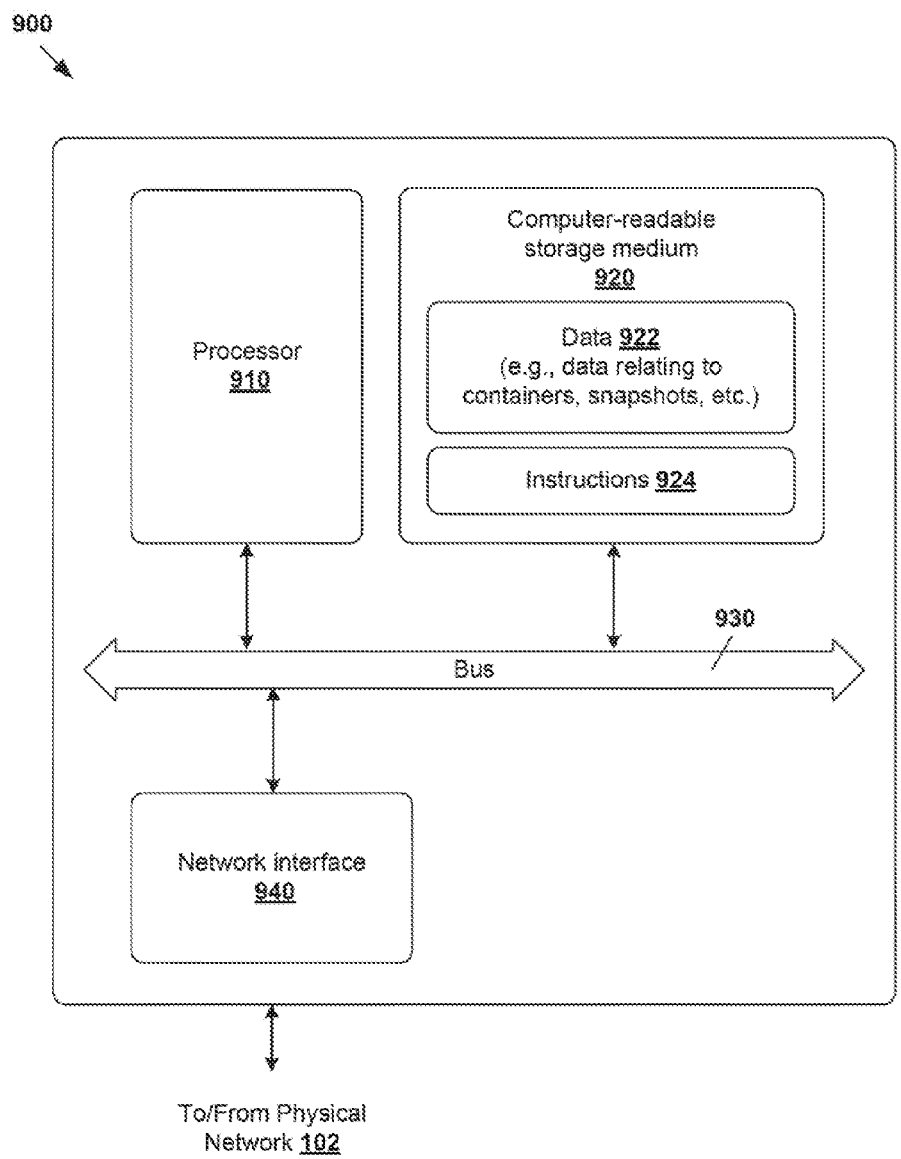
FIG. 9 is a schematic diagram illustrating an example computing device acting as a host.

The above examples can be implemented by hardware (including hardware logic circuitry), software or firmware or a combination thereof. FIG. 9 is a schematic diagram illustrating example computing device 900 acting as host 110. Example computing system 900 may include processor 910, computer-readable storage medium 920, network interface 940, and bus 930 that facilitates communication among these illustrated components and other components.

Processor 910 is to perform processes described herein with reference to the drawings. Computer-readable storage medium 920 may store any suitable data 922, such as data relating to containers, snapshots, virtual machines etc. Computer-readable storage medium 920 may further store computer-readable instructions 924 (e.g., program code) which, upon execution by processor 910, cause processor 910 to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method to provide fault tolerance for a container in a virtualized computing environment that includes a first virtual machine and a second virtual machine supported by one or more hosts, the method comprising:
   detecting a failure at the first virtual machine, wherein the container is supported by the first virtual machine to run an application on a first operating system of the first virtual machine;
   in response to detecting the failure at the first virtual machine and prior to providing data relating to the container to the second virtual machine, determining to resume the container in the second virtualized computing environment if a process in a kernel space of the first virtual machine causing the failure can be isolated from processes associated with the container;
   providing data relating to the container to the second virtual machine, wherein the data relating to the container includes data relating to the application in the container; and
   based on the data relating to the container, resuming the container in the second virtual machine to run the application on a second operating system of the second virtual machine.

2. The method of claim 1, wherein the providing data relating to the container to the second virtual machine comprises:
   creating a snapshot of the container that includes the data relating to the application; and
   storing the snapshot in a memory region that is accessible by the first virtual machine and second virtual machine, wherein the snapshot is accessible by the second virtual machine to resume the container.

3. The method of claim 2, wherein the determining to resume the container in the second virtualized computing environment, prior to creating the snapshot of the container, comprises:
   identifying a first task structure in whose context the failure has occurred at the first virtual machine;
   identifying one or more second task structures associated with the container; and
   determining that the one or more second task structures are isolated from the first task structure.

4. The method of claim 3, wherein the determining the one or more second task structures are isolated from the first task structure comprises performing one or more of the following:
   determining that the first task structure is not part of a same namespace as the one or more second task structures;
   determining that the one or more second task structures do not point to the first task structure;
   determining that an inter-process communication (IPC) channel is not established between the first task structure and the one or more second task structures; and
   determining that the one or more second task structures are not waiting for a result from the first task structure.

5. The method of claim 2, wherein the first virtual machine is supported by a first host and the second virtual machine is supported by a second host, and the method comprises:
   establishing a remote direct memory access (RDMA) channel between the first host and second host; and
   sending, via the RDMA channel, the snapshot of the container from the first virtual machine to the second virtual machine prior to resuming the container in the second virtual machine.

6. The method of claim 1, wherein the method further comprises:
   configuring the second virtual machine to be a clone of the first virtual machine.

7. The method of claim 6, wherein the method further comprises:
   configuring the second virtual machine to have a low scheduling priority or to be in a suspended state when the container is supported by the first virtual machine; and
   configuring the second virtual machine to have a higher scheduling priority or to resume from the suspended state when the container is resumed in the second virtual machine.

8. The method of claim 1, wherein, prior to resuming the container in the second virtualized computing environment, the method further comprises:
   identifying a transport layer connection between the first virtual machine and a network peer; and
   sending a keep-alive message to the network peer to maintain the transport layer connection such that the container is able to continue using the transport layer connection when resumed in the second virtual machine.

9. A non-transitory computer-readable storage medium that includes a set of instructions which, in response to execution by a processor of a host, cause the processor to perform a method to provide fault tolerance for a container in a virtualized computing environment that includes a first virtual machine and a second virtual machine supported by one or more hosts, the method comprising:
   detecting a failure at the first virtual machine, wherein the container is supported by the first virtual machine to run an application on a first operating system of the first virtual machine;
   in response to detecting the failure at the first virtual machine and prior to providing data relating to the container to the second virtual machine, determining to resume the container in the second virtualized computing environment if a process in a kernel space of the first virtual machine causing the failure can be isolated from processes associated with the container;
   providing data relating to the container to the second virtual machine, wherein the data relating to the container includes data relating to the application in the container; and
   based on the data relating to the container, resuming the container in the second virtual machine to run the application on a second operating system of the second virtual machine.

10. The non-transitory computer-readable storage medium of claim 9, wherein the providing data relating to the container to the second virtual machine comprises:
   creating a snapshot of the container that includes the data relating to the application; and
   storing the snapshot in a memory region that is accessible by the first virtual machine and second virtual machine, wherein the snapshot is accessible by the second virtual machine to resume the container.

11. The non-transitory computer-readable storage medium of claim 10, wherein the determining to resume the container in the second virtual machine, prior to creating the snapshot of the container, comprises:
   identifying a first task structure in whose context the failure has occurred at the first virtual machine;
   identifying one or more second task structures associated with the container; and
   determining that the one or more second task structures are isolated from the first task structure.

12. The non-transitory computer-readable storage medium of claim 11, wherein the determining the one or more second task structures are isolated from the first task structure comprises performing one or more of the following:
   determining that the first task structure is not part of a same namespace as the one or more second task structures;
   determining that the one or more second task structures do not point to the first task structure;
   determining that an inter-process communication (IPC) channel is not established between the first task structure and the one or more second task structures; and
   determining that the one or more second task structures are not waiting for a result from the first task structure.

13. The non-transitory computer-readable storage medium of claim 10, wherein the first virtual machine is supported by a first host and the second virtual machine is supported by a second host, and the method comprises:
   establishing a remote direct memory access (RDMA) channel between the first host and second host; and
   sending, via the RDMA channel, the snapshot of the container from the first virtual machine to the second virtual machine prior to resuming the container in the second virtual machine.

14. The non-transitory computer-readable storage medium of claim 9, wherein the method further comprises:
   configuring the second virtual machine to be a clone of the first virtual machine.

15. The non-transitory computer-readable storage medium of claim 14, wherein the method further comprises:
   configuring the second virtual machine to have a low scheduling priority or to be in a suspended state when the container is supported by the first virtual machine; and
   configuring the second virtual machine to have a higher scheduling priority or to resume from the suspended state when the container is resumed in the second virtual machine.

16. The non-transitory computer-readable storage medium of claim 9, wherein, prior to resuming the container in the second virtual machine, the method further comprises:
   identifying a transport layer connection between the first virtual machine and a network peer; and
   sending a keep-alive message to the network peer to maintain the transport layer connection such that the container is able to continue using the transport layer connection when resumed in the second virtual machine.

17. A computing device, comprising:
   a processor;
   a non-transitory computer-readable medium having stored thereon instructions that, when executed by the processor, cause the processor to:
      detect a failure at a first virtual machine, wherein a container is supported by the first virtual machine to run an application on a first operating system of the first virtual machine;
      in response to detecting the failure at the first virtual machine and prior to providing data relating to the container to the second virtual machine, determining to resume the container in the second virtualized computing environment if a process in a kernel space of the first virtual machine causing the failure can be isolated from processes associated with the container;
      provide data relating to the container to a second virtual machine, wherein
         the data relating to the container includes data relating to the application in the container; and
      based on the data relating to the container, resume the container in the second virtual machine to run the application on a second operating system of the second virtual machine.

18. The computing device of claim 17, wherein instructions for providing data relating to the container to the second virtual machine cause the processor to:
   create a snapshot of the container that includes the data relating to the application; and
   store the snapshot in a memory region that is accessible by the first virtual machine and second virtual machine, wherein the snapshot is accessible by the second virtual machine to resume the container.

19. The computing device of claim 18, wherein the instructions further cause the processor to, prior to creating the snapshot of the container, perform the following to determine to resume the container in the second virtual machine:
   identify a first task structure in whose context the failure has occurred at the first virtual machine;
   identify one or more second task structures associated with the container; and
   determine that the one or more second task structures are isolated from the first task structure.

20. The computing device of claim 19, wherein the instructions for determining the one or more second task structures are isolated from the first task structure cause the processor to perform one or more of the following:
   determine that the first task structure is not part of a same namespace as the one or more second task structures;
   determine that the one or more second task structures do not point to the first task structure;
   determine that an inter-process communication (IPC) channel is not established between the first task structure and the one or more second task structures; and
   determine that the one or more second task structures are not waiting for a result from the first task structure.

21. The computing device of claim 18, wherein the first virtual machine is supported by a first host implemented by the computing device, and the second virtual machine is supported by a second host, and the instructions further cause the processor to:

establish a remote direct memory access (RDMA) channel between the first host and second host; and send, via the RDMA channel, the snapshot of the container from the first virtual machine to the second virtual machine prior to resuming the container in the second virtual machine.

22. The computing device of claim 17, wherein the instructions further cause the processor to:

configure the second virtual machine to be a clone of the first virtual machine.

23. The computing device of claim 22, wherein the instructions further cause the processor to:

configure the second virtual machine to have a low scheduling priority or to be in a suspended state when the container is supported by the first virtual machine; and configure the second virtual machine to have a higher scheduling priority or to resume from the suspended state when the container is resumed in the second virtual machine.

24. The computing device of claim 22, wherein, prior to resuming the container in the second virtualized computing environment, the instructions further cause the processor to:

identify a transport layer connection between the first virtual machine and a network peer; and send a keep-alive message to the network peer to maintain the transport layer connection such that the container is able to continue using the transport layer connection when resumed in the second virtual machine.

* * * * *